(12) United States Patent
Weng et al.

(10) Patent No.: US 10,171,146 B2
(45) Date of Patent: Jan. 1, 2019

(54) MIMO RANK REDUCTION TO IMPROVE DOWNLINK THROUGHPUT

(71) Applicant: Telefonaktiebolaget LM Ericsson (publ), Stockholm (SE)

(72) Inventors: James Jianfeng Weng, Kanata (CA); Hua Xu, Kanata (CA); Xixian Chen, Ottawa (CA); Jianguo Long, Kanata (CA); Guoqiang Lu, Kanata (CA); Michael Roger, Nepean (CA); Ying Shao, Kanata (CA); Michel Chauvin, Kanata (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 15/549,762

(22) PCT Filed: Feb. 16, 2015

(86) PCT No.: PCT/IB2015/051139
§ 371 (c)(1),
(2) Date: Aug. 9, 2017

(87) PCT Pub. No.: WO2016/132173
PCT Pub. Date: Aug. 25, 2016

(65) Prior Publication Data
US 2018/0026688 A1 Jan. 25, 2018

(51) Int. Cl.
*H04L 1/06* (2006.01)
*H04B 7/0456* (2017.01)
(Continued)

(52) U.S. Cl.
CPC ......... *H04B 7/0482* (2013.01); *H04B 7/0486* (2013.01); *H04L 1/0026* (2013.01);
(Continued)

(58) Field of Classification Search
CPC ... H04B 7/0482; H04B 7/0486; H04L 1/0026; H04L 1/0033; H04L 1/06; H04L 1/1867
See application file for complete search history.

(56) References Cited

U.S. PATENT DOCUMENTS 8,654,816 B2 2/2014 Zhang et al.
9,203,590 B2 12/2015 Ren et al.
(Continued)

FOREIGN PATENT DOCUMENTS

EP 2439867 A1 4/2012

OTHER PUBLICATIONS

Author Unknown, "Technical Specification Group Radio Access Network; Evolved Universal Terrestrial Radio Access (E-UTRA); User Equipment (UE) radio transmission and reception (Release 12)," Technical Specification 36.101, Version 12.6.0, 3GPP Organizational Partners, Dec. 2014, 589 pages.
(Continued)

*Primary Examiner* — Janice N Tieu
(74) *Attorney, Agent, or Firm* — Withrow & Terranova, PLLC

(57) ABSTRACT

Systems and methods for Multiple-Input and Multiple-Output (MIMO) rank reduction to improve downlink throughput are disclosed. A method of operation of a radio access node includes determining that an imbalance between parallel channels of a spatial multiplexing downlink transmission to a wireless device is greater than an imbalance threshold and/or that a Negative Acknowledgement (NACK) rate over time for the parallel channels of a spatial multiplexing downlink transmission reported by the wireless device is greater than a NACK rate threshold. The method also includes, in response to determining that the imbalance between the parallel channels is greater than the imbalance threshold and/or that the NACK rate is greater than the
(Continued)

NACK rate threshold, performing a fast rank reduction for a next downlink transmission whereby a rank is reduced from a rank indicator reported by the wireless device to some lower rank. Reducing the rank may improve downlink throughput.

14 Claims, 10 Drawing Sheets

(51) Int. Cl.
   *H04L 1/00* (2006.01)
   *H04L 1/18* (2006.01)
(52) U.S. Cl.
   CPC .............. *H04L 1/0033* (2013.01); *H04L 1/06* (2013.01); *H04L 1/1867* (2013.01)

(56) References Cited

U.S. PATENT DOCUMENTS

| | | | |
|---|---|---|---|
| 9,252,856 B2* | 2/2016 | Wang | H04B 7/0486 |
| 9,750,030 B2* | 8/2017 | Barbieri | H04W 72/048 |
| 2009/0017769 A1 | 1/2009 | Chen et al. | |
| 2011/0094543 A1 | 4/2011 | Hasse et al. | |
| 2011/0299466 A1 | 12/2011 | Ofuji et al. | |
| 2013/0094543 A1* | 4/2013 | Zhang | H04L 5/0023 375/219 |
| 2013/0301560 A1 | 11/2013 | Geirhofer et al. | |
| 2015/0016560 A1 | 1/2015 | Kotecha et al. | |

OTHER PUBLICATIONS

Author Unknown, "Technical Specification Group Radio Access Network; Evolved Universal Terrestrial Radio Access (E-UTRA); Physical channels and modulation (Release 12)," Technical Specification 36.211, Version 12.4.0, 3GPP Organizational Partners, Dec. 2014, 124 pages.

Author Unknown, "Technical Specification Group Radio Access Network; Evolved Universal Terrestrial Radio Access (E-UTRA); Multiplexing and channel coding (Release 12)," Technical Specification 36.212, Version 12.3.0, 3GPP Organizational Partners, Dec. 2014, 89 pages.

Author Unknown, "Technical Specification Group Radio Access Network; Evolved Universal Terrestrial Radio Access (E-UTRA); Physical layer procedures (Release 10)," Technical Specification 36.213, Version 10.9.0, 3GPP Organizational Partners, Feb. 2013, 126 pages.

He, Jinwei, et al., "Dual Threshold Mode Switching Criteria for Diversity and Spatial Multiplexing in LTE," 8th International Conference on Wireless Communications, Networking and Mobile Computing (WiCOM), Sep. 21-23, 2012, Shanghai, China, IEEE, 4 pages.

HTC, "R1-112640: Real Life Issues for DL-MIMO," 3rd Generation Partnership Project (3GPP), TSG-RAN WG1 #66, Aug. 22-26, 2011, 3 pages, Athens, Greece.

Mediatek Inc., "R4-133641: Phase-2 simulation details and parameters," 3rd Generation Partnership Project (3GPP), TSG RAN WG4 Meeting #68, Aug. 19-23, 2013, 3 pages, Barcelona, Spain.

International Search Report and Written Opinion for International Patent Application No. PCT/IB2015/051139, dated Dec. 1, 2015, 22 pages.

International Preliminary Report on Patentability for International Patent Application No. PCT/IB2015/051139, dated May 23, 2017, 11 pages.

* cited by examiner

MIMO RANK REDUCTION TO IMPROVE DOWNLINK THROUGHPUT

This application is a 35 U.S.C. § 371 national phase filing of International Application No. PCT/IB2015/051139, filed Feb. 16, 2015, the disclosure of which is incorporated herein by reference in its entirety.

FIELD OF THE DISCLOSURE

The present disclosure relates to Multiple-Input and Multiple-Output (MIMO) downlink transmission by a radio access node.

BACKGROUND

In cellular communications networks, Multiple-Input and Multiple-Output (MIMO) systems facilitate a radio link using multiple transmit and receive antennas. These may be used to increase the reliability of a transmission by taking advantage of multichannel transmissions or by providing spatial diversity. MIMO systems may also be used to increase the throughput of a radio link by transmitting more information at the same time. To assist downlink scheduling in a MIMO system, a wireless device will report at least one of a Rank Indicator (RI), downlink Channel Quality Indicator (CQI) report, Hybrid Automatic Repeat Request (HARQ) Acknowledgement (ACK) and/or Negative Acknowledgement (NACK) feedback. A radio access node, in determining the number of layers to use to perform a downlink transmission to the wireless device, needs to consider the reported RI, CQI, and HARQ ACK/NACK feedback.

There may be times when the RI reported by a wireless device is not accurate. Some factors affecting the accuracy of the RI include an abrupt change in channel condition. The rank after the change may be different from a previously reported rank. Often RI and CQI reporting is scheduled periodically, and a period is chosen to make a compromise between the need for more frequent reports in time-varying wireless channels and the uplink resources to be consumed by the reporting. That means more frequent reporting cannot be scheduled to cover this abrupt channel condition change.

Another reason the RI reported by a wireless device may not be accurate is that the wireless device may be using device specific rank determination algorithms. For instance, the $3^{rd}$ Generation Partnership Program (3GPP) Technical Specification (TS) 36.101 defines minimum performance requirements regarding rank reporting, but those are only minimum requirements. For different vendors, device specific rank determination algorithms may not use the same criteria, and they may not necessarily maximize the throughput.

The RI reported by a wireless device also may not be accurate because of inter-cell interference. Wireless devices commonly use Cell-specific Reference Signals (CRS) across several subframes to determine a rank and an associated CQI. Due to the fact that inter-cell interference may not affect the Physical Downlink Shared Channel (PDSCH) region to the same degree that the inter-cell interference affects CRS, the rank estimated based on CRS could be aggressive or conservative, not reflecting the actual PDSCH decoding capability.

Antenna correlation can also lead to the RI reported by a wireless device being inaccurate. Antenna correlation will cause a MIMO channel matrix to have a large eigenvalue spread, meaning layers will have different Signal-to-Noise Ratios (SNRs). Wireless devices may use this eigenvalue spread to determine a rank. If the eigenvalue spread is larger than a threshold, a step-down rank may be determined.

An inaccurate RI reported by a wireless device may cause the radio access node to transmit more data than the channel conditions will support. This can cause a reduction in the downlink throughput from the radio access node to the wireless device. As such, there is a need for systems and methods of operating a radio access node in a cellular communications network to compensate for the inaccuracy of the RI reported by a wireless device.

SUMMARY

Systems and methods for Multiple-Input and Multiple-Output (MIMO) rank reduction to improve downlink throughput are disclosed. In some embodiments, a method of operation of a radio access node in a cellular communications network includes determining that an imbalance between parallel channels of a spatial multiplexing downlink transmission to a wireless device based on measurements where each measurement is indicative of a signal quality for a corresponding one of the parallel channels is greater than an imbalance threshold and/or that a Negative Acknowledgement (NACK) rate over time for the parallel channels of a spatial multiplexing downlink transmission reported by the wireless device is greater than a NACK rate threshold. The method also includes, in response to determining that the imbalance between the parallel channels is greater than the imbalance threshold and/or that the NACK rate is greater than the NACK rate threshold, performing a fast rank reduction for a next downlink transmission whereby a rank is reduced from a rank indicator reported by the wireless device to some lower rank. Reducing the rank may improve downlink throughput.

In some embodiments, each measurement is a Signal-to-Noise Ratio (SNR), a rank indicator (RI), a channel quality indicator (CQI), an acknowledgement (ACK) or negative acknowledgement (NACK) to a downlink transmission, a Signal-to-Interference-plus-Noise Ratio (SINR), a Received Signal Strength Indicator (RSSI), a Reference Signal Received Power (RSRP) value, or Reference Signal Received Quality (RSRQ) value.

In some embodiments, determining that the imbalance between the parallel channels is greater than the imbalance threshold comprises determining that an adjusted SNR, which is a sum of the SNR mapped from a plurality of CQI plus a HARQ ACK/NACK based adjustment, is less than a measurement threshold. In some embodiments, the measurement threshold is such that an expected throughput of the next downlink transmission to the wireless device will be larger if the rank is reduced from the rank indicator reported by the wireless device to some lower rank. In some embodiments, the measurement threshold is the ratio of a linear power boost factor minus 1 times a maximum adjusted SNR to one plus the maximum adjusted SNR.

In some embodiments, the NACK rate over time reported by the wireless device is proportional to a number of NACK pairs for the parallel channels of a spatial multiplexing downlink transmission reported by the wireless device.

In some embodiments, the next downlink transmission is to be transmitted with more than one codeword, and the method also includes determining that the next downlink transmission will use Quadrature Phase Shift Keying (QPSK). Performing the rank reduction includes, in response to determining that the imbalance between the parallel channels is greater than the imbalance threshold, and in response to determining that the next downlink transmission will use QPSK, increasing transmit power for a chosen codeword of the next downlink transmission using QPSK that corresponds to one or more channels of the parallel channels with measurements higher than the other channels by a predefined power increase and transmitting a different codeword of the next downlink transmission with zero power. In some embodiments, the predefined power increase is equal to 3 decibels (dB).

In some embodiments, in response to determining that the NACK rate is greater than the NACK rate threshold, performing the fast rank reduction for the next downlink transmission includes using transmit diversity for the next downlink transmission.

In some embodiments, performing the rank reduction for the next downlink transmission includes searching for a reduced rank Precoding Matrix Indicator (PMI) that matches a PMI from a codebook that is used by the wireless device for PMI reporting and if a reduced rank PMI that matches the PMI from the codebook that is used by the wireless device for PMI reporting is found, using the reduced rank PMI for the next downlink transmission. In some embodiments, the reduced rank PMI matches the PMI from the codebook that is used by the wireless device for PMI reporting if the column vectors of the reduced rank PMI are equal to the subset of column vectors of the PMI from the codebook that is used by the wireless device for PMI reporting for a chosen codeword that corresponds to one or more channels of the parallel channels with measurements higher than the other channels.

In some embodiments, a method of operation of a radio access node in a cellular communications network includes determining that a rank restriction indicator is larger than a first rank restriction threshold and, in response to determining that the rank restriction indicator is larger than the first rank restriction threshold, communicating a rank restriction update message to the wireless device that the rank indicators available to be chosen should be restricted to a first rank restriction value. The method also includes determining that the rank restriction indicator is smaller than a second rank restriction threshold and, in response to determining that the rank restriction indicator is smaller than the second rank restriction threshold, communicating a rank restriction update message to the wireless device that the rank indicators available to be chosen should be restricted to a second rank restriction value.

In some embodiments, the rank restriction indicator is based on a filtered reported rank based on rank indicators reported by the wireless device over time and/or on a fast rank reduction rate. In some embodiments, the cellular communications network is a Long Term Evolution (LTE) cellular communications network.

In some embodiments, a device is adapted to determine that an imbalance between parallel channels of a spatial multiplexing downlink transmission to a wireless device based on measurements where each measurement is indicative of a signal quality for a corresponding one of the parallel channels is greater than an imbalance threshold and/or that a NACK rate over time for the parallel channels of a spatial multiplexing downlink transmission reported by the wireless device is greater than a NACK rate threshold. In response to determining that the imbalance between the parallel channels is greater than the imbalance threshold and/or that the NACK rate is greater than the NACK rate threshold, the device is adapted to perform a rank reduction for the next downlink transmission whereby the rank is reduced from a rank indicator reported by the wireless device to some lower rank.

In some embodiments, a radio access node in a cellular communications network includes at least one processor and a memory coupled to the at least one processor. The memory contains instructions executable by the at least one processor whereby the radio access node is operative to determine that an imbalance between parallel channels of a spatial multiplexing downlink transmission to a wireless device based on measurements where each measurement is indicative of a signal quality for a corresponding one of the parallel channels is greater than an imbalance threshold and/or that a NACK rate over time for the parallel channels of a spatial multiplexing downlink transmission reported by the wireless device is greater than a NACK rate threshold. In response to determining that the imbalance between the parallel channels is greater than the imbalance threshold and/or that the NACK rate is greater than the NACK rate threshold, the radio access node is operative to perform a rank reduction for a next downlink transmission whereby a rank is reduced from a rank indicator reported by the wireless device to some lower rank.

In some embodiments, a radio access node includes a NACK and imbalance determining module operative to determine that an imbalance between parallel channels of a spatial multiplexing downlink transmission to a wireless device based on measurements where each measurement is indicative of the signal quality for a corresponding one of the parallel channels is greater than an imbalance threshold and/or that a NACK rate over time for the parallel channels of a spatial multiplexing downlink transmission reported by the wireless device is greater than a NACK rate threshold. The radio access node also includes a rank reduction module operative to, in response to determining that the imbalance between the parallel channels is greater than the imbalance threshold and/or that the NACK rate is greater than the NACK rate threshold, perform a rank reduction for a next downlink transmission whereby a rank is reduced from a rank indicator reported by the wireless device to some lower rank.

Those skilled in the art will appreciate the scope of the present disclosure and realize additional aspects thereof after reading the following detailed description of the embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

A cellular communications network, may comprise, e.g., a Long Term Evolution (LTE) network (e.g., Frequency Division Duplexing (FDD) or Time Division Duplexing (TDD)), a Universal Terrestrial Radio Access (UTRA) network, a Code Division Multiple Access (CDMA) network, WiMAX, a Global System for Mobile Communications (GSM) network, or any network employing any one or more Radio Access Technologies (RATs) for cellular operation. The description of many of the embodiments provided herein focuses on LTE and, as such, LTE terminology is oftentimes used; however, the embodiments described herein are not limited to the LTE RAT.

Figure 1:
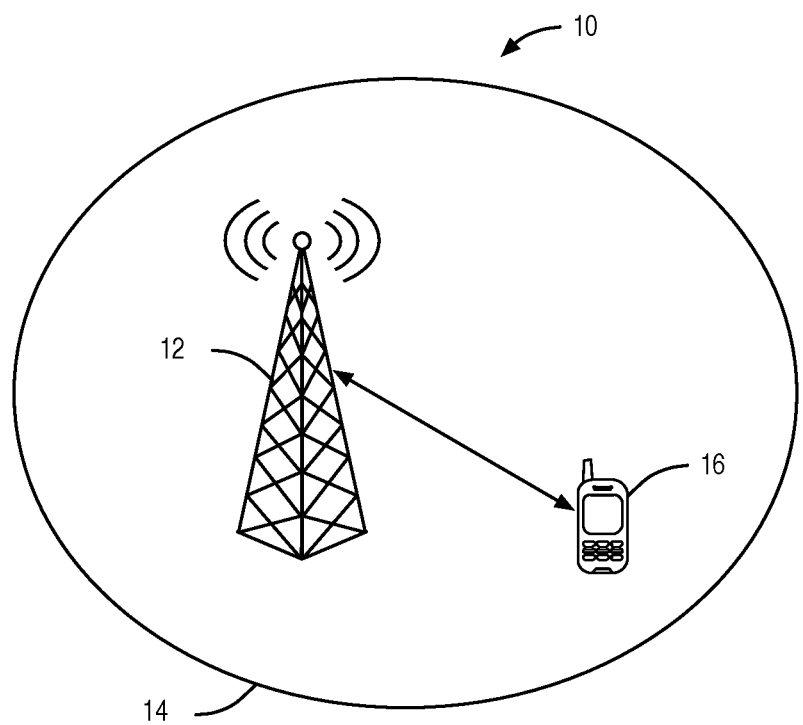
FIG. 1 illustrates a cellular communications network according to some embodiments of the present disclosure.

Before discussing the embodiments of the current disclosure, an exemplary cellular communications network 10 is discussed. In FIG. 1, radio access node 12 (referred to herein as radio access node 12 or radio access nodes 12) provides a cell 14 (referred to herein as cell 14 or cells 14). In this exemplary cellular communications network 10, radio access node 12 provides wireless service to a wireless device 16 in the cell 14. While only one wireless device 16 is shown here for simplicity, there may be many wireless devices 16 in the cell 14. The radio access node 12 may be, for example, a 3GPP LTE eNB, and the wireless device 16 may be, for example, a 3GPP LTE User Equipment (UE).

In the embodiments described herein, the radio access node 12 and the wireless device 16 each have more than one antenna. This allows for a Multiple-Input and Multiple-Output (MIMO) system to be used for a radio link between the radio access node 12 and the wireless device 16 using multiple transmit and receive antennas. This may be used to increase the reliability of a transmission by taking advantage of multichannel transmissions or by providing spatial diversity. MIMO systems may also be used to increase the throughput of a radio link.

To assist downlink scheduling in a MIMO system, the wireless device 16 will report at least one of Rank Indicator (RI), downlink Channel Quality Indicator (CQI), and Hybrid Automatic Repeat Request (HARQ) Acknowledgement (ACK) and/or Negative Acknowledgement (NACK) feedback to the radio access node 12. In some embodiments, the wireless device 16 will also report an associated Precoding Matrix Indicator (PMI). The radio access node 12 considers the reported RI, CQI, HARQ ACK/NACK, and PMI when determining the number of layers to use to perform a downlink transmission to the wireless device 16.

Figure 2:
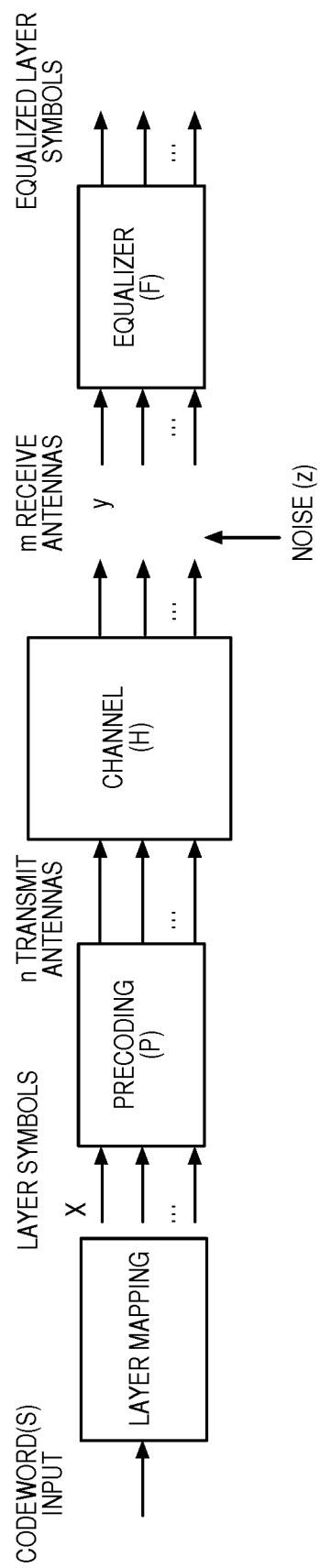
FIG. 2 illustrates a model of a Multiple-Input and Multiple-Output (MIMO) system according to some embodiments of the present disclosure.

FIG. 2 illustrates a model of a MIMO system according to some embodiments of the present disclosure. As shown in FIG. 2, one or more codewords to be transmitted are mapped to layer symbols, precoded, and transmitted over a MIMO channel. Currently, in 3GPP LTE, there are at most two codewords. Here, codewords can be understood as data streams, while precoding maps the layer symbols to antennas with different weights. Each layer symbol occupies a Resource Element (RE). Layer mapping translates one or more codewords into layer symbols x. These layer symbols pass through a precoding matrix P which maps the layer symbols x to n different transmit antennas. Once transmitted, the signals pass through the channel to a wireless device 16. This channel is modeled as a matrix H which describes the relationship between the signals transmitted by the transmit antennas of the radio access node 12 and the signals received by the receive antennas of the wireless device 16. At the receive side, the MIMO channel output plus a noise vector z can be considered as a received signal vector y. This received signal vector y is received at m receive antennas and will often pass through an equalizer F to provide an equalized layer symbol vector for further processing (not shown). The further processing may include Log Likelihood Ratio (LLR) calculation, rate dematching, Turbo decoding, and other methods to determine what was transmitted for each codeword, according to some embodiments.

With this model of the MIMO system, the received signal vector y can be written in this form:

$$y = H \cdot P \cdot x + z \quad (1)$$

where H is an m×n MIMO channel matrix, P is an n×L precoding matrix, x is a vector of L-layer symbols to be transmitted, and z is a noise vector for the background Gaussian noise. The noise vector z is assumed to be with zero mean and with variance matrix being an identity matrix. It can be assumed without loss of generality that a power scaling has been absorbed into the layer symbol vector x. Here, all layer symbols have equal power $\sigma_x^6$. It is noteworthy to mention that in some embodiments, the noise vector z often has a variance matrix (m×m) of $R_{zz}$. At the receiver, the precoding matrix P is known, but MIMO channel matrix H and noise correlation matrix $R_{zz}$ need to be estimated. In that case, equalizers may whiten the noise first by passing the received signal vector through a filter matrix $R_{zz}^{-1/2}$ in some embodiments. Here, for the sake of simplicity, the noise is assumed to have been whitened, and $R_{zz}^{-1/2}$ has been absorbed into the channel matrix H.

In determining the number of codewords and/or the number of layer symbols that should be transmitted, the radio access node 12 uses a RI reported by the wireless device 16. This RI is an indication of how many parallel channels the wireless device 16 estimates can be supported with the current channel conditions. As discussed above, there may be times when the RI reported by wireless device 16 may not be accurate. An inaccurate RI reported by the wireless device 16 may cause the radio access node 12 to transmit more data than the channel conditions will support. This can cause a reduction in the downlink throughput from the radio access node 12 to the wireless device 16.

Figure 3:
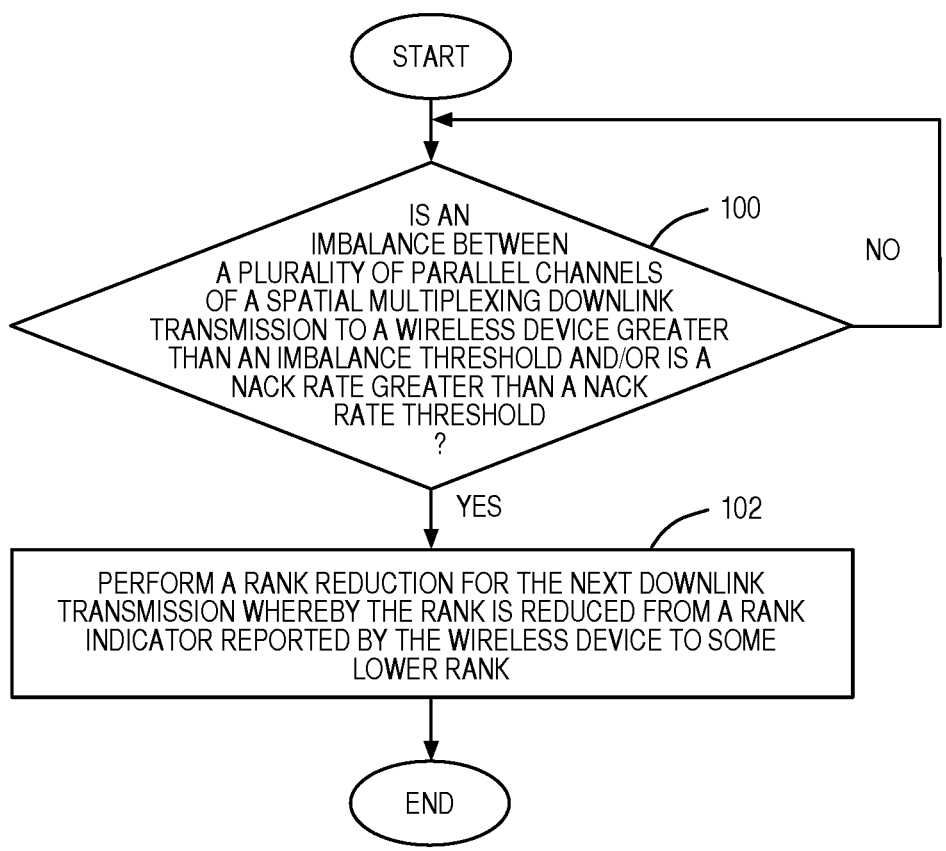
FIG. 3 illustrates the operation of a radio access node for MIMO rank reduction according to some embodiments of the present disclosure.

FIG. 3 illustrates the operation of a radio access node 12 for MIMO rank reduction according to some embodiments of the present disclosure. While this process is performed by the radio access node 12 in this example, the process may be performed by any suitable network node or any suitable combination of network nodes. In some embodiments, the radio access node 12 determines whether: (a) an imbalance between parallel channels of a spatial multiplexing downlink transmission to the wireless device 16 is greater than an imbalance threshold and/or (b) a Negative Acknowledgement (NACK) rate over time for the parallel channels of the spatial multiplexing downlink transmission reported by the wireless device 16 is greater than a NACK rate threshold (step 100). Notably, to be clear, step 100 may include determining whether criterion (a) is true, determining whether criterion (b) is true, determining whether criterion (a) or criterion (b) is true, or determining whether both criterion (a) and criterion (b) are true, depending on the particular embodiment.

The radio access node 12 determines the imbalance based on measurements that are indicative of signal qualities for the parallel channels. More specifically, each measurement is indicative of a signal quality for a corresponding one of the parallel channels. In some embodiments, these measurements can be Signal-to-Noise Ratio (SNR) values, RI values, acknowledgements (ACKs) to a downlink transmission, Signal-to-Interference-plus-Noise Ratio (SINR) values, Received Signal Strength Indicator (RSSI) values, Reference Signal Received Power (RSRP) values, Reference Signal Received Quality (RSRQ) values, or other suitable measurements. For simplicity, the measurements are SNR values for the examples herein, but the disclosure is not limited thereto.

Also, according to some embodiments, the NACK rate over time reported by the wireless device 16 is proportional to a number of NACK pairs for the parallel channels of the spatial multiplexing downlink transmission reported by the wireless device. For instance, if the downlink transmission to the wireless device 16 includes two codewords, receiving a NACK for both codewords in that transmission would be considered a NACK pair. While the examples herein discuss using either one or two codewords for simplicity, the disclosure is not limited thereto.

If the imbalance between the parallel channels is greater than the imbalance threshold and/or the NACK rate is greater than the NACK rate threshold, the radio access node 12 performs a fast rank reduction for a next downlink transmission whereby a rank is reduced from a rank indicated by a rank indicator reported by the wireless device 16 to some lower rank (step 102). As discussed below, the rank reduction may be an effective rank reduction (e.g., transmitting one codeword with increased power and transmitting the other codeword with zero power) or an actual rank reduction. By reducing rank when the condition(s) in step 100 are present, downlink throughput may be improved.

Figure 4:
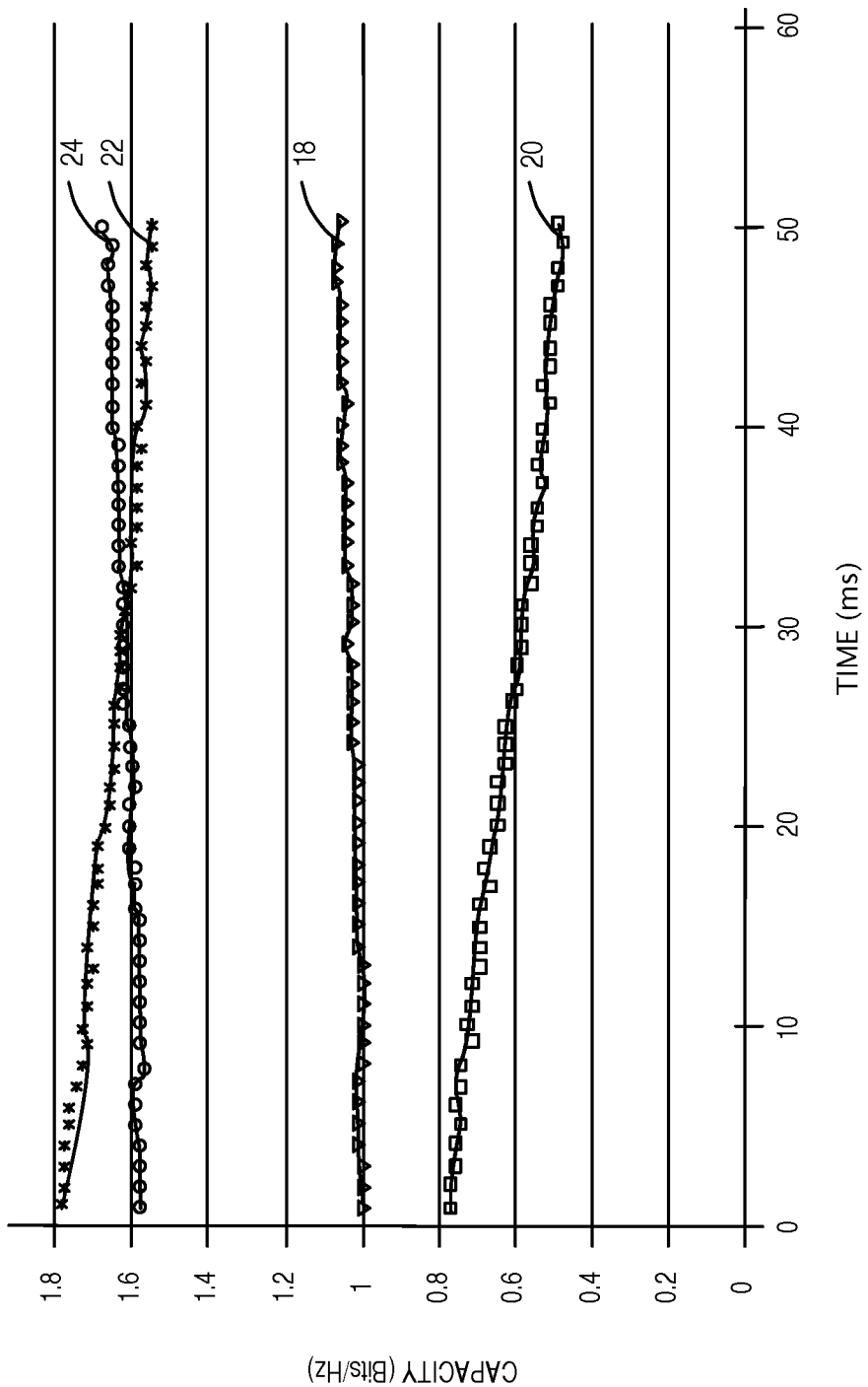
FIG. 4 illustrates an example of how downlink throughput may be improved by MIMO rank reduction according to some embodiments of the present disclosure.

FIG. 4 illustrates an example of how downlink throughput is improved by MIMO rank reduction according to some embodiments of the present disclosure. FIG. 4 shows an example of a spatial multiplexing with two parallel channels of the same bandwidth and with signal to noise ratio $SNR_1$ and $SNR_2$ for two codewords. The channel capacity per bandwidth Hertz (Hz) in bits/Hz according to Shannon theorem can be given by:

$$C_1 = C(SNR_1) = \log_2(1 + SNR_1)$$

$$C_2 = C(SNR_2) = \log_2(1 + SNR_2) \quad (2)$$

In FIG. 4, the channel capacity of the first parallel channel is shown as line 18, and the channel capacity of the second parallel channel is shown as line 20. To consider the case where one channel has a lower SNR than the other, without loss of generality, it is assumed that $SNR_1 \geq SNR_2$. Further, there is a predefined power increase of $\Delta$dB SNR gain if one codeword is transmitted instead of two codewords. The channel capacity per bandwidth Hz for one codeword transmission with a minimum of $\Delta$dB SNR gain can be written as $$C(SNR_1 + \Delta \text{ dB}) = \log_2(1 + \kappa_\Delta \cdot SNR_1) \quad (3)$$

where $K_\Delta = 10^{\{\Delta/10\}}$ is a linear power boost factor.

When $SNR_2$ is equal to $SNR_1$, the sum of $C(SNR_1)$ and $C(SNR_2)$ is always larger than $C(SNR_1 + \Delta)$, which means two-codeword transmission can provide a higher throughput than one-codeword transmission. In FIG. 4, the capacity of using both channels is shown as line 22, which is the summation of lines 18 and 20. The channel capacity of the first channel with a predefined power increase of 3 dB is shown as line 24. When $SNR_2$ drops to a certain SNR threshold ($SNR_T$), however, the sum of two capacities shown as line 22 may be smaller than $C(SNR_1 + \Delta)$ shown as line 24. This SNR threshold can be found to be $$SNR_2 < SNR_T = \frac{(\kappa_\Delta - 1)SNR_1}{1 + SNR_1} \quad (4)$$

In other words, in some embodiments when two codewords have imbalanced SNRs and the lower SNR is less than $SNR_T$, computed from the higher SNR, there is a clear advantage by transmitting one stronger codeword, also referred to as the chosen codeword, as in that case all transmit power can be concentrated on that codeword rather than being split between two codewords.

In some embodiments, a radio access node 12 may determine the SNR for each of two codewords as a summation of an SNR mapped from a plurality of CQI reports for the corresponding codeword from a wireless device 16 and an outer-loop adjustment based on a plurality of Acknowledgement (ACK) and/or Negative Acknowledgement (NACK) feedback reports for the corresponding codeword from the wireless device 16. The ACK/NACK feedback report for a codeword is an indication of whether or not the wireless device 16 successfully decoded a previous PDSCH transmission of the codeword. If the decoding for a previous PDSCH transmission of a codeword is unsuccessful, the wireless device 16 will send back an NACK report.

A CQI reported from a wireless device 16 may depend on an RI reported from the wireless device 16 as the wireless device 16 may determine its RI based on the downlink channel it sees and then determine the associated CQI. A radio access node 12 may employ the outer-loop adjustment to take into account the PDSCH decoding capability at the wireless device 16 in determining SNRs for two codewords so that inaccurate CQIs reported from the wireless device 16 can be corrected to some extent. The radio access node 12 may further determine a rank different from the RI reported from the wireless device 16 to be used together with the determined SNRs for two codewords in link adaptation for the wireless device 16.

As known to those skilled in the art, link adaptation is part of downlink scheduling, and its main task is to determine for each wireless device 16 the resource allocation, modulation and coding scheme (MCS), and power level according to the requests and quality of the radio links. In this case, the quality of the radio link to a wireless device 16 is represented by the SNRs determined by the radio access node 12 for two codewords, which includes an outer-loop adjustment. For more details regarding outer-loop adjustment and its use in link adaptation, the interested reader is directed to U.S. patent application Ser. No. 14/071,829, entitled GENERALIZED OUTER LOOP LINK ADAPTATION, now U.S. Pat. No. 9,203,590, which is hereby incorporated herein by reference for its teachings on outer-loop adjustment.

Figure 5:
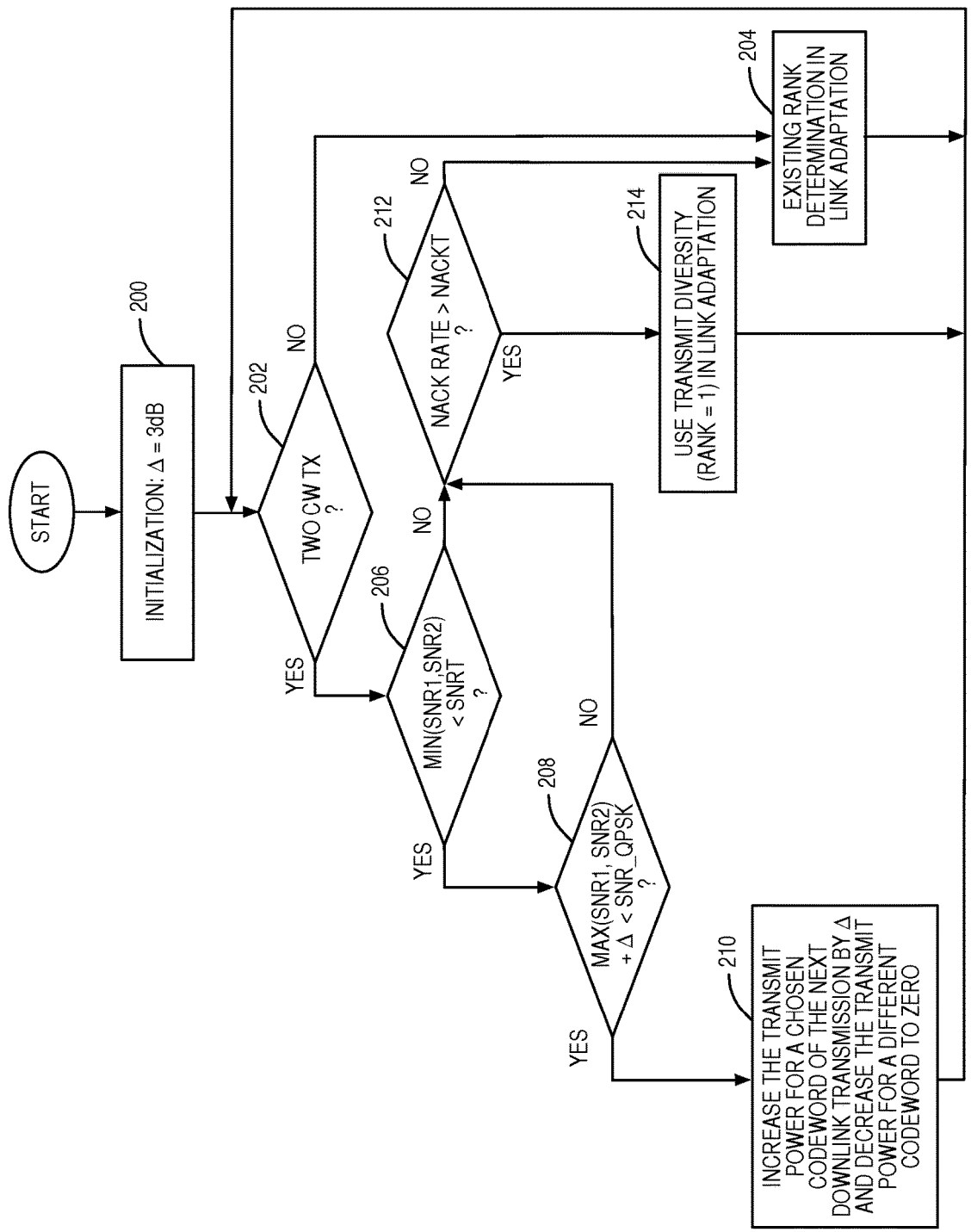
FIG. 5 illustrates the operation of a radio access node for MIMO rank reduction according to some embodiments of the present disclosure.

FIG. 5 illustrates the operation of the radio access node 12 for MIMO rank reduction according to some embodiments of the present disclosure. Again, while in this example the process is performed by the radio access node 12, this process may be performed by any suitable network node or any suitable combination of network nodes. In this example, the MIMO formed by the radio access node 12 and the wireless device 16 is an open-loop MIMO system. One particular example of such an open-loop MIMO system is LTE's Transmission Mode 3 (TM3) as prescribed in 3GPP TS 36.213. Note that within TM3, different MIMO transmission schemes can be used for a Physical Downlink Control Channel (PDCCH) and a Physical Downlink Shared Channel (PDSCH). In particular, a transmit diversity scheme is used for PDCCH, while both a transmit diversity scheme and a large delay Cyclic Delay Diversity (CDD) scheme may be used for PDSCH. The large delay CDD scheme is also known as open-loop spatial multiplexing and is employed only when the reported rank from the wireless device 16 is larger than one so as to transmit more than one codeword simultaneously to improve downlink throughput. For PDSCH transmission, the transmit diversity scheme can carry one codeword only, so it is often used when the reported rank is one. As the transmit diversity scheme is more robust against channel fading and noise, it may also be used when the reported rank is larger than one. As such, the use of the transmit diversity scheme may not depend on the reported rank from the wireless device 16. Information on the MIMO scheme being used for PDSCH and the associated number of layers is indicated in a Data Control Information (DCI) portion carried by PDCCH. For various MIMO schemes, 3GPP TS36.211 defines their precoding details while 3GGP TS36.212 defines DCI formats that may be used. In LTE, link adaptation is done on a per subframe basis, and each subframe is 1 ms in time duration. Within each subframe, PDCCH carrying DCI to provide wireless devices 16 with necessary scheduling information in terms of resource allocation, MCS information, and power level information is transmitted, followed by one or more PDSCH transmissions for one or more wireless devices 16. Thus, in some embodiments, the process of FIG. 5 is performed with respect to LTE TM3 and its associated MIMO transmission schemes for a PDSCH transmission.

As illustrated, first, the radio access node 12 initializes a predefined power increase to be 3 dB (step 200). While this value is used as an example, this disclosure is not limited thereto. Next, the radio access node 12 checks whether the next transmission is a two codeword transmission (step 202). The next transmission is the transmission that is currently being processed to determine whether rank reduction for this transmission should be performed. Again, while this example uses two codewords, this disclosure is not limited thereto. More generally, the next transmission may be checked to see if it is a multi-codeword transmission. For LTE, the number of codewords is currently limited to two. As such, for the remainder of the description of FIG. 5, the focus is on two codewords. However, it should be appreciated that the process extends to the use of up to any number of two or more codewords. If the next downlink transmission does not use two codewords, the radio access node 12 proceeds to use existing rank determination in link adaptation (step 204).

If the next downlink transmission is a two codeword transmission, the radio access node 12 checks whether the smallest SNR value of the two codewords is less than an SNR threshold (step 206). As used herein, the SNR of a codeword is the SNR for the MIMO channel over which the codeword is to be transmitted. This threshold may be computed in many ways, such as by using Equation 4 above. If the smallest SNR value of the SNR values for the two codewords is less than the SNR threshold, then the imbalance between the parallel channels is greater than the imbalance threshold. In response, the radio access node 12 chooses the codeword with the largest SNR for transmission and then checks whether the next downlink transmission is a QPSK transmission. In this example, the radio access node 12 determines whether the next downlink transmission is a QPSK transmission by determining whether the maximum SNR, which is the maximum of the SNR values for the MIMO channels of the two codewords, plus the predefined power increase is less than a QPSK SNR threshold (step 208). Note that QPSK is only an example and is particularly applicable to LTE. More generally, the radio access node 12 checks whether the next downlink transmission will use a modulation scheme that does not have an amplitude component.

There are multiple different Modulation and Coding Schemes (MCSs) that can be used in a downlink transmission from the radio access node 12 to the wireless device 16. Some MCSs, such as 16 Quadrature Amplitude Modulation (QAM) and 64 QAM in LTE, have both amplitude and phase modulation components and, as such, rely on the wireless device 16 to know ahead of time what the power level of the transmission is in order to properly decode the transmission. QPSK, as well as other MCSs, do not have an amplitude component and, as such, do not require the wireless device 16 to know the power level of the transmission to properly decode the transmission.

As such, if the radio access node 12 determines that the next downlink transmission will not use QPSK (or any other modulation scheme that does not include an amplitude component) if transmitted with the predetermined power increase, the radio access node 12 proceeds to check whether a NACK rate over time reported by the wireless device 16 is greater than a NACK threshold (step 212). Conversely, if the radio access node 12 determines the next downlink transmission will use QPSK (or some other modulation scheme that does not include an amplitude component), even with the addition of the predefined power increase, the radio access node 12 performs a fast rank reduction by: (i) increasing the transmit power for the chosen codeword (the codeword corresponding to the maximum SNR value) of the next downlink transmission by the predefined power increase and (ii) decreasing the transmit power for a different codeword to zero (step 210). This is referred to herein as an effective rank reduction and can also be considered a codeword reduction. Alternatively, codeword reduction can be accomplished by assigning all available transmit power to a single codeword instead of splitting the total transmit power across multiple codewords.

Returning to step 206, if the radio access node 12 does not determine that the smallest SNR value of the codewords is less than the SNR threshold, the radio access node 12 checks whether a NACK rate over time reported by the wireless device 16 is greater than a NACK threshold (step 212). In some embodiments, the NACK rate over time reported by the wireless device 16 is proportional to a number of NACK pairs for the parallel channels of the spatial multiplexing downlink transmission reported by the wireless device 16. For instance, if the downlink transmission to the wireless device 16 includes two codewords, receiving a NACK for both codewords in that transmission would be considered a NACK pair. Receiving multiple NACK pairs within a predefined time window may be an indication that the downlink transmission was too aggressive for the actual channel conditions. If the NACK rate is greater than the NACK threshold, this may indicate that the RI reported by the wireless device 16 is higher than the actual channel conditions would make appropriate. As such, if the radio access node 12 determines that the NACK rate is greater than the NACK threshold, the process proceeds to step 214 to use the transmit diversity scheme in link adaptation, which can carry one codeword and is considered as rank=1. The reason for using the transmit diversity scheme is that the NO path from step 206 indicates that SNRs are not imbalanced, and the YES path from step 212 indicates that it is not a good choice to continue using two codewords. Therefore, a rank reduction occurs, and the transmit diversity scheme is used for one codeword in link adaptation. If the NACK rate is not greater than the NACK threshold, the radio access node 12 proceeds to use existing rank determination in link adaptation in step 204. The determined rank and the PDSCH transmission scheme are indicated in the DCI portion of the PDCCH transmitted with the PDSCH transmission within each subframe. In other words, the rank reduction operation here is fast and can vary from one subframe to another. Because of that, it is referred to herein as fast rank reduction.

Note that while FIG. 5 illustrates the check of whether the imbalance between the parallel channels is greater than the imbalance threshold before the check of whether the NACK rate is greater than the NACK rate threshold, the two checks can be done in either order, singly, or in parallel.

Figure 6:
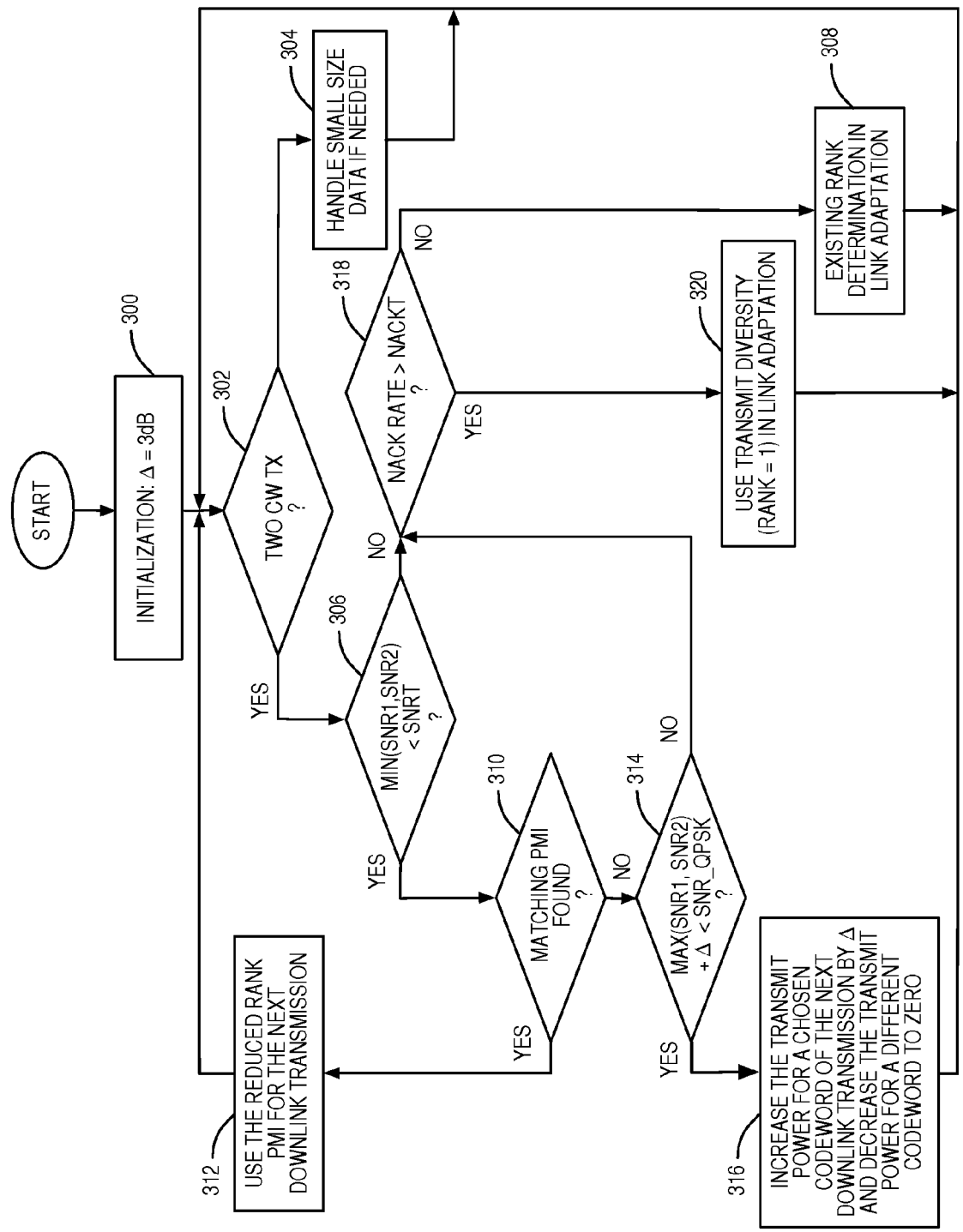
FIG. 6 illustrates the operation of a radio access node for MIMO rank reduction when precoding matrices are used according to some embodiments of the present disclosure.

In some embodiments of MIMO spatial multiplexing, the wireless device 16 reports an associated PMI. MIMO systems such as this are often referred to as closed-loop systems. One example of such a closed-loop MIMO system is LTE's Transmission Mode 4 (TM4). Within TM4, different MIMO transmission schemes can be used for PDCCH and PDSCH. To be specific, a transmit diversity scheme is used for PDCCH, while both a transmit diversity scheme and a closed-loop spatial multiplex scheme may be used for PDSCH. The closed-loop spatial multiplex scheme is employed only when the reported rank from the wireless device 16 is larger than one so as to transmit more than one codeword simultaneously to improve downlink throughput. The use of the transmit diversity scheme does not depend on the reported rank from the wireless device 16. Information on the MIMO scheme being used for PDSCH and the associated number of layers is indicated in the DCI portion carried by PDCCH. In this regard, FIG. 6 illustrates the operation of the radio access node 12 for MIMO rank reduction for a closed loop MIMO system (e.g., LTE TM4) and its associated transmission schemes for PDSCH according to some embodiments of the present disclosure.

First, the radio access node 12 initializes the predefined power increase to be 3 dB (step 300). Next, the radio access node 12 checks whether the next transmission is a two codeword transmission (step 302). Again, while this example uses two codewords, this disclosure is not limited thereto. More generally, it is possible to check to see if the next transmission is a multi-codeword transmission. For LTE, the number of codewords is currently limited to two. As such, for the remainder of the description of FIG. 6, the focus is on two codewords. However, it should be appreciated that the process extends to the use of up to any number of two or more codewords. If the next downlink transmission will not use two codewords, the radio access node 12 may handle small size data if needed (step 304). If the amount of data to be transmitted in the downlink is low enough that two codewords are not needed, the radio access node 12 may utilize a fast rank reduction to transmit the one codeword with higher transmit power, even if the channel conditions would support the transmission of two codewords. That is, even if the channel conditions would support the transmission of more than one codeword, the radio access node 12 may still only send one codeword with additional transmit power to increase the chance the single codeword will be properly received by the wireless device 16.

If the next downlink transmission is a two codeword transmission, the radio access node 12 checks whether the smallest SNR value of the codewords is less than an SNR threshold (step 306). This threshold may be computed in many ways, such as by using Equation 4 above. If the smallest SNR value of the SNR values for the two codewords is less than the SNR threshold, then the imbalance between the parallel channels is greater than the imbalance threshold. In response, the radio access node 12 chooses the codeword with the largest SNR for transmission and then checks whether a matching PMI for the chosen codeword is found (step 310). A matching PMI is a precoding matrix with a reduced rank that matches a corresponding subset of a precoding matrix determined by the RI and PMI previously reported by the wireless device 16. The corresponding subset of a precoding matrix (P) is a set of column vectors from P to be used by the layer symbols from the chosen codeword. To be specific, if the reported rank=2, the corresponding subset for the first codeword is the first column vector of P while the corresponding subset for the second codeword is the second column vector of P. If the reported rank=3, the corresponding subset for the first codeword is the first column vector of P while the corresponding subset for the second codeword is the second and third column vectors of P. If the reported rank=4, the corresponding subset for the first codeword is the first two column vectors of P while the corresponding subset for the second codeword is the last two column vectors of P. If a matching PMI is found, the radio access node 12 uses the reduced rank PMI for the next downlink transmission to the wireless device 16 (step 312). This is referred to herein as an actual rank reduction. Since the precoding matrix is designed for a lower rank transmission, an additional transmit power gain is already included in the reduced rank precoding matrix. The wireless device 16 will decode the transmission using the PMI reported to the radio access node 12 which will match the precoding weights for the chosen codeword.

As an example of finding a matching PMI, Table 1 below is a copy of Table 6.3.4.2.3-2 from 3GPP TS 36.211. Table 1 is a codebook for transmission on antenna ports {0, 1, 2, 3} and for CSI reporting based on antenna ports {0, 1, 2, 3} or {15, 16, 17, 18}. In this example, codebook indices 1, 6-8, 10-13, and 15 correspond to PMI with a precoding matrix for number of layers=2 being the first two column vectors of the precoding matrix at the same row but for number of layers=4. For these codebook indices, a matching PMI can be easily found if the rank reduction is from a RI of 4 that is being reduced to a rank of 2, and the chosen codeword with the largest SNR is the first codeword. That is, the matching, reduced rank PMI matches the PMI from the codebook that is used by the wireless device 16 for PMI reporting if the column vectors of the reduced rank PMI are equal to the subset of column vectors of the PMI from the codebook that is used by the wireless device 16 for PMI reporting for the chosen codeword. The chosen codeword in this case is the first codeword. Similarly, a matching PMI can be easily found if the rank reduction is from an RI of 2 that is being reduced to a rank of 1, and if the chosen codeword with the largest SNR is the first codeword as for a given PMI, the first column vector of a precoding matrix used for rank 2 is also the precoding matrix used for rank=1 with the same PMI.

If the second codeword instead of the first codeword is chosen, the precoding matrices with the reduced rank must be searched to find a PMI that can match the corresponding subset of the precoding matrix associated with the reported rank and reported PMI. In the rank reduction case for the second codeword from rank=2 to rank=1, the matching PMI can be also found for all PMIs except for PMI=4 or 5. In other rank reduction cases for the second codeword, however, the matching PMI cannot be found.

that QPSK is only an example and is particularly applicable to LTE. More generally, the radio access node 12 checks whether the next downlink transmission will use a modulation scheme that does not have an amplitude component. If the radio access node 12 determines that the next downlink transmission will use QPSK modulation, even with the addition of the predefined power increase, the radio access node 12 performs a fast rank reduction by increasing the transmit power for the chosen codeword (the codeword corresponding to the maximum SNR value), of the next downlink transmission by the predefined power increase and the radio access node 12 decreasing the transmit power for a different codeword to zero (step 316). This is referred to herein as an effective rank reduction, and can also be considered a codeword reduction.

Returning to step 306, if the radio access node 12 does not determine that the smallest SNR value of the codewords is less than an SNR threshold, which means SNR is not imbalanced, the radio access node 12 checks whether a NACK rate is greater than a NACK threshold (step 318). In some embodiments, the NACK rate over time reported by the wireless device 16 is proportional to a number of NACK pairs for the parallel channels of a spatial multiplexing downlink transmission reported by the wireless device 16. For instance, if the downlink transmission to the wireless device 16 includes two codewords, receiving a NACK for both codewords in that transmission would be considered a NACK pair. Receiving multiple NACK pairs within a predefined time window may be an indication that the downlink transmission was too aggressive for the actual channel conditions. If a NACK rate is greater than a NACK thresh-

TABLE 1

| Codebook index | $u_n$ | Number of layers $v$ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j/\sqrt{2})]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

If no matching PMI is found, the radio access node 12 checks whether the next downlink transmission is a QPSK transmission. In this example, the radio access node 12 determines whether the next downlink transmission is a QPSK transmission by determining whether the maximum SNR plus the predefined power increase is less than a QPSK SNR threshold (step 314). Again, QPSK, as well as other MCS do not require the wireless device 16 to know the power level of the transmission. As such, if the radio access node 12 determines that the next downlink transmission would not use QPSK if transmitted with the predetermined power increase, the radio access node 12 proceeds to check whether a NACK rate over time reported by the wireless device 16 is greater than a NACK threshold (step 318). Note old, this may indicate that the RI reported by the wireless device 16 is higher than the actual channel conditions would make appropriate. As such, if the radio access node 12 determines that the NACK rate is greater than the NACK threshold, the process proceeds to step 320 to use the transmit diversity scheme in link adaptation, which can carry one codeword and is considered as rank=1. If the NACK rate is not greater than the NACK threshold, the radio access node 12 proceeds to use existing rank determination in link adaptation in step 308.

Note that while FIG. 6, like FIG. 5, illustrates the check of whether the imbalance between the parallel channels is greater than the imbalance threshold before the check of whether the NACK rate is greater than the NACK rate threshold, the two checks can be done in either order, singly, or in parallel.

Figure 7:
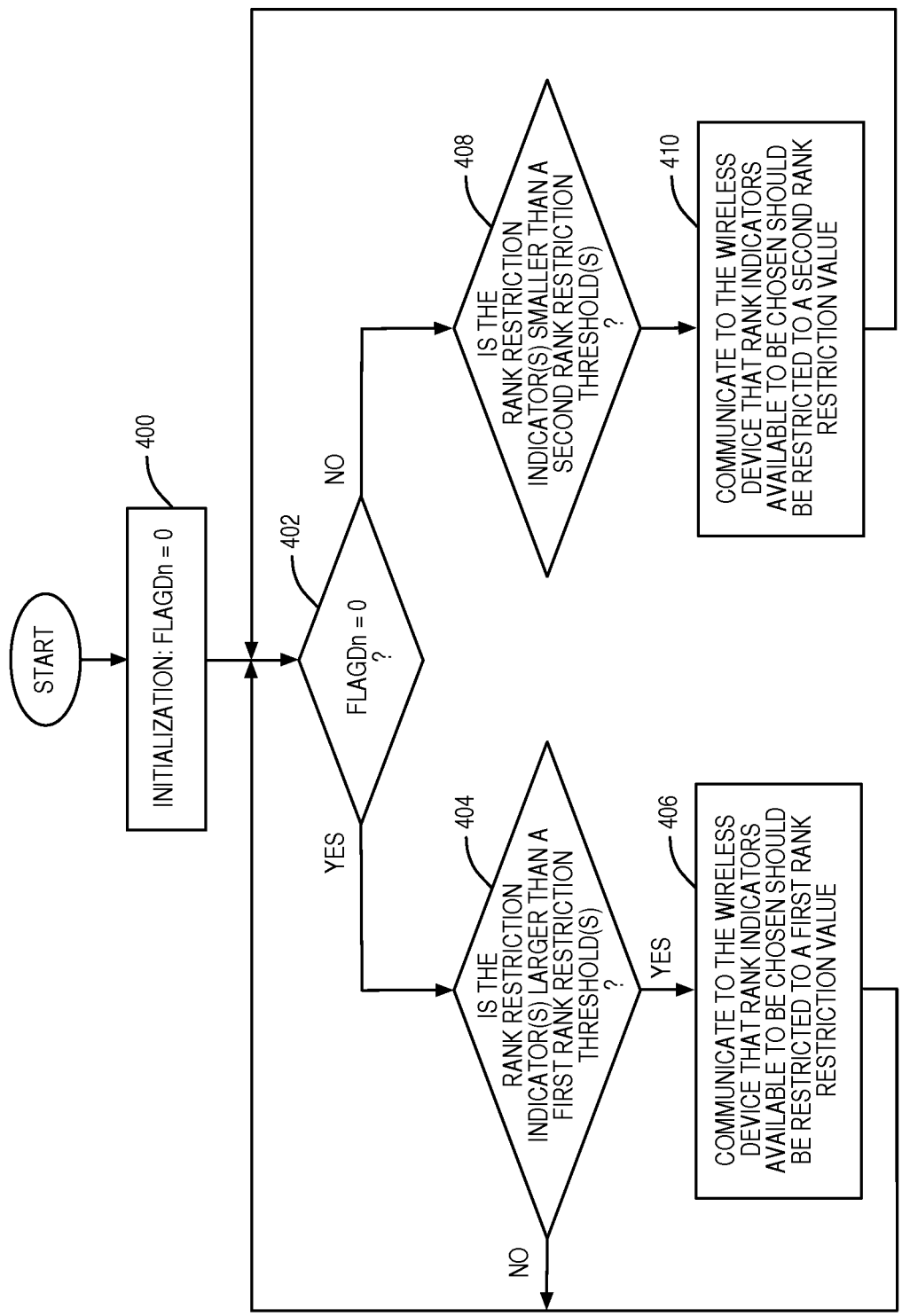
FIG. 7 illustrates the operation of a radio access node for MIMO rank reduction by restricting the rank indicators available to be chosen by a wireless device according to some embodiments of the present disclosure.

The embodiments described in FIGS. 3, 5, and 6 perform a fast rank reduction that can adjust with each downlink transmission. In other embodiments, if, for example, the radio access node 12 determines that the wireless device 16 is consistently overestimating the RI, a longer term solution may be desired. In this regard, FIG. 7 illustrates the operation of a radio access node 12 for MIMO rank reduction by restricting the RIs available to be reported by the wireless device 16 according to some embodiments of the present disclosure. As illustrated, the radio access node 12 initializes a flagDn to 0 to indicate that no restriction is currently in place (step 400). The radio access node 12 then checks whether the flagDn is set to 0 (step 402). If the flagDn is set to 0, this means that there is currently no restriction on the RIs available to be chosen by the wireless device 16.

The radio access node then determines whether a rank restriction indicator(s) is (are) larger than a first rank restriction threshold(s) (step 404). The rank restriction indicator(s) is (are) a measure of whether or not the RIs available to be reported by the wireless device 16 should be restricted. In some embodiments, the wireless device 16 only evaluates non-restricted ranks and, as such, only reports non-restricted ranks. As discussed with respect to FIG. 8, in some embodiments the rank restriction indicator(s) includes two indicators with a separate threshold for each, namely a RI that is calculated by filtering RIs received from the wireless device 16 over some time period and a fast rank reduction rate. In other embodiments, the rank restriction indicator can be either the filtered RI or the fast rank reduction rate (FRRR). The fast rank reduction rate is a measure of how frequently fast rank reduction (e.g., as described above in relation to FIGS. 3, 5, and 6) has been performed for the wireless device 16 over some time period. If the rank restriction indicator(s) is (are) larger than a first rank restriction threshold(s), the radio access node 12 communicates to the wireless device 16 that RIs available to be chosen should be restricted to a first rank restriction value (step 406). In some embodiments, the first rank restriction value is lower than the full rank able to be reported. One way to accomplish this is to use RRC reconfiguration messages to update a codebook restriction set for the wireless device 16. Specifically, the wireless device 16 may be restricted to report PMI and RI within a precoder codebook subset specified by a bitmap parameter codebookSubsetRestriction included in an RRC message.

Returning to step 402, if the flagDn is not set to 0, this means that there is currently some restriction on the RIs available to be chosen by the wireless device 16. The radio access node 12 then determines whether a rank restriction indicator is smaller than a second rank restriction threshold (step 408). If the rank restriction indicator is smaller than the second rank restriction threshold, the radio access node 12 communicates to the wireless device 16 that RIs available to be chosen should be restricted to a second rank restriction value (step 410). In some embodiments, the second rank restriction value is higher than the first rank restriction value and may be the full rank able to be reported. In this way, determining that the rank restriction indicator is smaller than the second rank restriction threshold is equivalent to determining that RIs available for the wireless device 16 to report should not be restricted. Again, one way to accomplish this is to use RRC reconfiguration messages to update a codebook restriction set for the wireless device 16. Specifically, the wireless device 16 may be restricted to report PMI and RI within a precoder codebook subset specified by a bitmap parameter codebookSubsetRestriction included in an RRC message.

Figure 8:
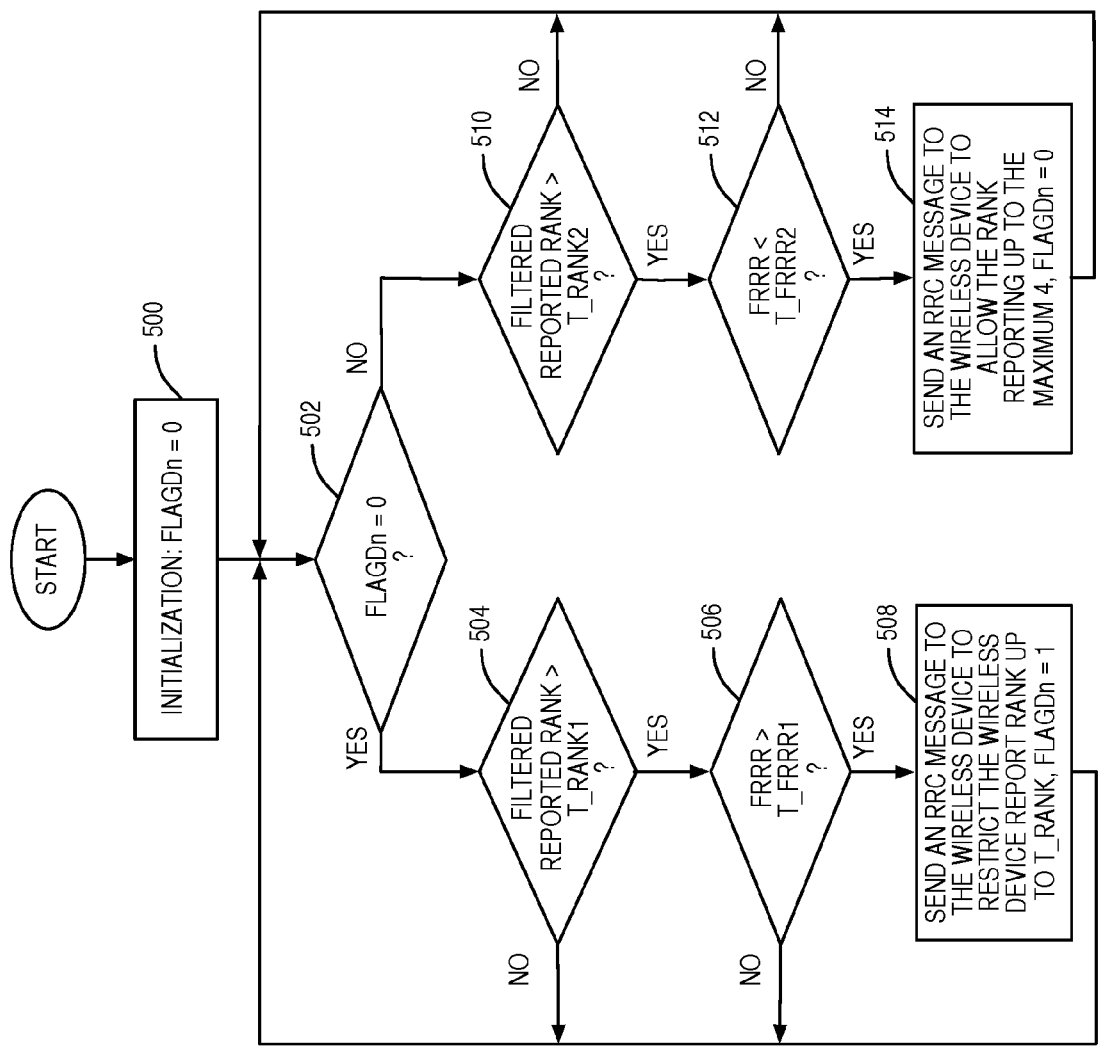
FIG. 8 illustrates the operation of a radio access node for MIMO rank reduction by restricting the rank indicators available to be chosen by a wireless device by sending a Radio Resource Control (RRC) message according to some embodiments of the present disclosure.

FIG. 8 illustrates the operation of the radio access node 12 to perform MIMO rank reduction by restricting the RIs available to be reported by the wireless device 16 according to some other embodiments of the present disclosure. As illustrated, the radio access node 12 initializes a flagDn to 0 to indicate that no restriction is currently in place (step 500). The radio access node 12 then checks whether the flagDn is set to 0 (step 502). If the flagDn is set to 0, this means that there is currently no restriction on the RIs available to be chosen by the wireless device 16. The radio access node then determines whether a filtered reported rank is larger than a first threshold rank (step 504). The filtered reported rank is, for example, an average rank reported by the wireless device 16 over some defined period of time. If the filtered reported rank is larger than the first threshold rank, the radio access node 12 checks whether the FRRR is larger than a first FRRR threshold (step 506). The FRRR is a measure of how frequently a fast rank reduction (e.g., as described above in relation to FIGS. 3, 5, and 6) has been performed for the wireless device 16 over some time period. For instance, if the first FRRR threshold is set to a hundred fast rank reductions per second, then an average of more than one fast rank reduction per subframe would cause the FRRR to be greater than the first FRRR threshold. The value of this threshold may be a balance of maximizing downlink throughput and minimizing computational costs. If the FRRR is larger than the first FRRR threshold, the radio access node 12 sends an RRC message to the wireless device 16 to restrict the wireless device 16 to reporting rank up to the threshold rank and sets the flagDn to 1 to indicate that the RIs available to be reported by the wireless device 16 are currently restricted (step 508). Here, when a filtered reported RI from a wireless device 16 is larger than a first threshold rank, and the FRRR for the wireless device 16 is larger than the first FRRR threshold, it means the wireless device 16 keeps reporting a higher rank than it can actually support. In this case, there may be a need to impose a rank restriction to restrict the wireless device 16 from reporting higher ranks. Otherwise, the process returns to step 502 and is repeated for the next transmission. Note that while FIG. 8 illustrates the check of whether the filtered reported rank is greater than the rank threshold before the check of whether the FRRR is greater than the FRRR threshold, the two checks can be done in either order, singly, or in parallel.

If the flagDn is not set to 0, this means that there is currently some restriction on the RIs available to be chosen by the wireless device 16. Specifically, the RIs available for the wireless device 16 to report is restricted to the threshold rank as in step 508. The radio access node 12 then determines whether the filtered reported rank is larger than a second threshold rank (step 510). If the filtered reported rank is larger than the second threshold rank, this indicates that the wireless device 16 is likely consistently reporting the maximum RI allowed, the second threshold rank. The radio access node 12 then checks whether the FRRR is less than a second FRRR threshold (step 512). If the FRRR is less than the second FRRR threshold, the radio access node 12 sends an RRC message to the wireless device 16 to allow rank reporting up to the maximum rank, which is 4 in this example, and sets the flagDn to 0 to indicate that the RIs available to be reported by the wireless device 16 are not currently restricted (step 514). Here, when a filtered reported RI from a wireless device 16 is larger than a second threshold rank and the FRRR for the wireless device 16 is smaller than the second FRRR threshold, it means the wireless device 16 keeps reporting a higher rank that it can actually support. In this case, there may be a need to send a new rank restriction to actually allow the wireless device 16 to report additional ranks or all available ranks. In some embodiments, the second FRRR threshold will be smaller than the first FRRR threshold to prevent a rapid switch back and forth between a restricted state and an unrestricted state. This may be accomplished by using a different algorithm to determine each value or by introducing a hysteresis factor (an addition to the up threshold, a subtraction from the down threshold, or both).

Figure 9:
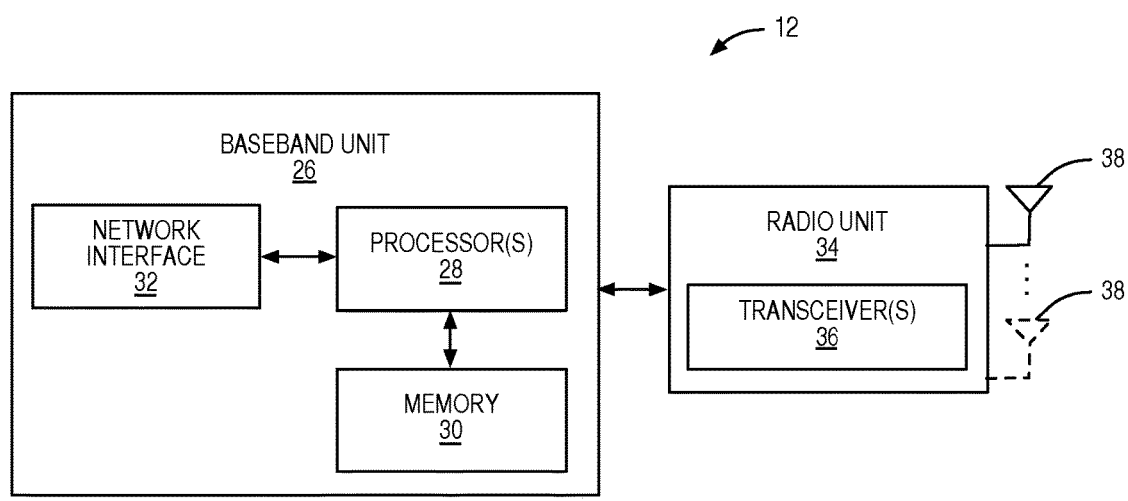
FIG. 9 is a block diagram of a radio access node according to some embodiments of the present disclosure.

FIG. 9 is a block diagram of a radio access node 12 (e.g., a base station) according to some embodiments of the present disclosure. As illustrated, the radio access node 12 includes a baseband unit 26 including one or more processors 28, memory 30, and a network interface 32, and one or more radio units 34 including one or more transceivers 36 connected to two or more antennas 38. The transceiver 36 generally includes analog and, in some embodiments, digital components for wirelessly sending and receiving data to and from the wireless devices 16. From a wireless communications protocol view, the transceiver 36 implements at least part of Layer 1 (i.e., the Physical or "PHY" Layer).

The one or more processors 28 generally implement any remaining portion of Layer 1 not implemented by the transceiver 36, as well as functions for higher layers in the wireless communications protocol (e.g., Layer 2 (data link layer), Layer 3 (network layer), etc.). In particular embodiments, the one or more processors 28 may comprise, for example, one or several general-purpose or special-purpose microprocessors or other microcontrollers programmed with suitable software and/or firmware to carry out some or all of the functionality of the radio access node 12 described herein. In addition or alternatively, the one or more processors 28 may comprise various digital hardware blocks (e.g., one or more Application Specific Integrated Circuits (ASICs), one or more off-the-shelf digital and analog hardware components, or a combination thereof) configured to carry out some or all of the functionality of the radio access node 12 described herein. Additionally, in particular embodiments, the above-described functionality of the radio access node 12 may be implemented, in whole or in part, by the one or more processors 28 executing software or other instructions stored on a non-transitory computer-readable medium such as, for example, the memory 30 or any other suitable type of data storage component(s).

Figure 10:
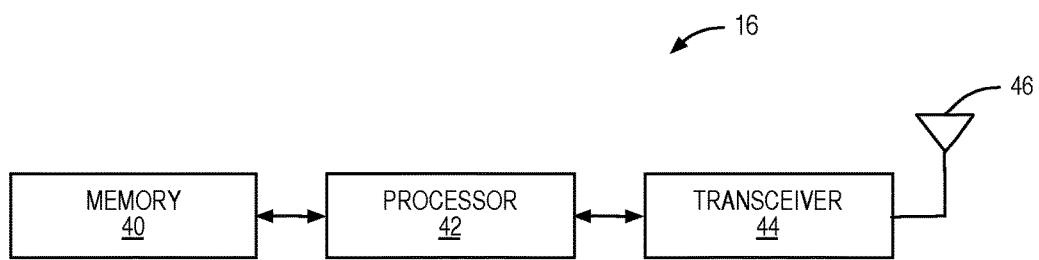
FIG. 10 is a block diagram of a wireless device according to some embodiments of the present disclosure.

FIG. 10 is a block diagram of a wireless device according to some embodiments of the present disclosure. As illustrated, the wireless device 16 includes a memory 40, one or more processors 42, and one or more transceiver 44 connected to two or more antennas 46. The transceiver 44 generally includes analog and, in some embodiments, digital components for wirelessly sending and receiving data to and from the radio access node 12. From a wireless communications protocol view, the transceiver 44 implements at least part of Layer 1 (i.e., the Physical or "PHY" Layer). The processor 42 generally implements any remaining portion of Layer 1 not implemented by the transceiver 44, as well as functions for higher layers in the wireless communications protocol (e.g., Layer 2 (data link layer), Layer 3 (network layer), etc.). In particular embodiments, the processor 42 may comprise, for example, one or several general-purpose or special-purpose microprocessors or other microcontrollers programmed with suitable software and/or firmware to carry out some or all of the functionality of the wireless device 16 described herein. In addition or alternatively, the processor 42 may comprise various digital hardware blocks (e.g., one or more ASICs, one or more off-the-shelf digital and analog hardware components, or a combination thereof) configured to carry out some or all of the functionality of the wireless device 16 described herein. Additionally, in particular embodiments, the above-described functionality of the wireless device 16 may be implemented, in whole or in part, by the processor 42 executing software or other instructions stored on a non-transitory computer-readable medium, such as the memory 40 or any other suitable type of data storage component(s).

Figure 11:
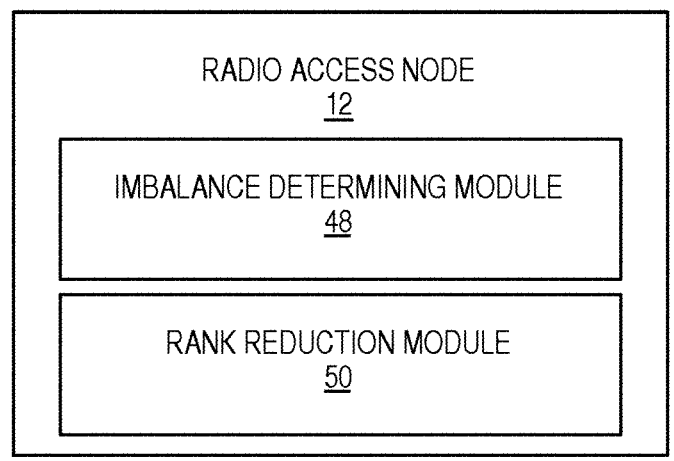
FIG. 11 is a block diagram of a radio access node for MIMO rank reduction according to some embodiments of the present disclosure.

FIG. 11 is a block diagram of a radio access node 12 for MIMO rank reduction according to some embodiments of the present disclosure. As illustrated, the radio access node 12 includes a NACK and imbalance determining module 48 and a rank reduction module 50 that are each implemented in software that, when executed by a processor of the radio access node 12, causes the radio access node 12 to operate according to any one of the embodiments described herein. The NACK and imbalance determining module 48 operates to provide the functionality of the radio access node 12 with respect to steps 100, 206, 212, 306, and 318 described above. Likewise, the rank reduction module 50 operates to provide the functionality of the radio access node 12 with respect steps 102, 210, 214, 312, 316, 320, 406, 410, 508, and 514 described above.

In some embodiments, a computer program includes instructions which, when executed by at least one processor, causes the at least one processor to carry out the functionality of the radio access node 12 according to any one of the embodiments described herein. In one embodiment, a carrier containing the aforementioned computer program product is provided. The carrier is one of an electronic signal, an optical signal, a radio signal, or a computer-readable storage medium (e.g., a non-transitory computer-readable medium such as the memory 30 shown in FIG. 9).

The following acronyms are used throughout this disclosure.

3GPP $3^{rd}$ Generation Partnership Project
ACK Acknowledgement
ASIC Application Specific Integrated Circuit
CDD Cyclic Delay Diversity
CDMA Code Division Multiple Access
CQI Channel Quality Indicator
CRS Cell-specific Reference Signals
dB decibel
DCI Data Control Information
eNB Evolved NodeB
FDD Frequency Division Duplexing
FRRR Fast Rank Reduction Rate
GSM Global System for Mobile Communications
Hz Hertz
LLR Log Likelihood Ratio
LTE Long Term Evolution
MCS Modulation and Coding Scheme
MIMO Multiple-Input and Multiple-Output
NACK Negative Acknowledgement
PDCCH Physical Downlink Control Channel
PDSCH Physical Downlink Shared Channel
PMI Precoding Matrix Indicator
QAM Quadrature Amplitude Modulation
QPSK Quadrature Phase Shift Keying
RAT Radio Access Technology
RI Rank Indicator
RRC Radio Resource Control
RSRP Reference Signal Received Power
RSRQ Reference Signal Received Quality RSSI Received Signal Strength Indicator
SINR Signal-to-Interference-plus-Noise Ratio
SNR Signal-to-Noise Ratio
TDD Time Division Duplexing
TM3 Transmission Mode 3
TM4 Transmission Mode 4
TS Technical Specification
UE User Equipment
UTRA Universal Terrestrial Radio Access
WiMAX Worldwide Interoperability for Microwave Access Those skilled in the art will recognize improvements and modifications to the embodiments of the present disclosure. All such improvements and modifications are considered within the scope of the concepts disclosed herein and the claims that follow.

What is claimed is:

1. A method of operation of a radio access node in a cellular communications network comprising:
   determining at least one of that an imbalance between a plurality of parallel channels of a spatial multiplexing downlink transmission to a wireless device based on a plurality of measurements where each measurement is indicative of a signal quality for a corresponding one of the parallel channels is greater than an imbalance threshold and that a Negative Acknowledgement (NACK) rate over time for the plurality of parallel channels of a spatial multiplexing downlink transmission reported by the wireless device is greater than a NACK rate threshold; and
   in response to determining at least one of that the imbalance between the plurality of parallel channels is greater than the imbalance threshold and that the NACK rate is greater than the NACK rate threshold, performing a fast rank reduction for a next downlink transmission whereby a rank is reduced from a rank indicator reported by the wireless device to some lower rank.

2. The method of claim 1 wherein each measurement of the plurality of measurements is chosen from a group consisting of at least one of a Signal-to-Noise Ratio (SNR), a rank indicator (RI), a channel quality indicator (CQI), an acknowledgement (ACK) or negative acknowledgement (NACK) to a downlink transmission, Signal-to-Interference-plus-Noise Ratio (SINR), Received Signal Strength Indicator (RSSI), Reference Signal Received Power (RSRP) value, and Reference Signal Received Quality (RSRQ) value.

3. The method of claim 1 wherein determining that the imbalance between the plurality of parallel channels is greater than the imbalance threshold comprises determining that an adjusted Signal-to-Noise Ratio (SNR) which is a sum of the SNR mapped from a plurality of Channel Quality Indicators (CQIs) plus an Acknowledgement (ACK) or Negative Acknowledgement (NACK) based adjustment is less than a measurement threshold.

4. The method of claim 3 wherein the measurement threshold is such that an expected throughput of the next downlink transmission to the wireless device will be larger if the rank is reduced from the rank indicator reported by the wireless device to some lower rank.

5. The method of claim 4 wherein the measurement threshold is the ratio of a linear power boost factor minus 1 times a maximum adjusted SNR to one plus the maximum adjusted SNR.

6. The method of claim 1 wherein the NACK rate over time reported by the wireless device is proportional to a number of NACK pairs for the plurality of parallel channels of a spatial multiplexing downlink transmission reported by the wireless device.

7. The method of claim 1 wherein the next downlink transmission is to be transmitted with more than one codeword, further comprising:
   determining that the next downlink transmission will use Quadrature Phase Shift Keying (QPSK);
   wherein performing the fast rank reduction comprises, in response to determining that the imbalance between the plurality of parallel channels is greater than the imbalance threshold, and in response to determining that the next downlink transmission will use QPSK:
      increasing transmit power for a chosen codeword of the next downlink transmission using QPSK that corresponds to one or more channels of the plurality of parallel channels with measurements higher than other channels of the plurality of parallel channels by a predefined power increase and transmitting a different codeword of the next downlink transmission with zero power.

8. The method of claim 7 wherein the predefined power increase is equal to 3 decibels.

9. The method of claim 1 wherein, in response to determining that the NACK rate is greater than the NACK rate threshold, performing the fast rank reduction for the next downlink transmission comprises:
   using transmit diversity for the next downlink transmission.

10. The method of claim 1 wherein performing the fast rank reduction for the next downlink transmission comprises searching for a reduced rank Precoding Matrix Indicator (PMI) that matches a PMI from a codebook that is used by the wireless device for PMI reporting and if a reduced rank PMI that matches the PMI from the codebook that is used by the wireless device for PMI reporting is found, using the reduced rank PMI for the next downlink transmission.

11. The method of claim 10 wherein the reduced rank PMI matches the PMI from the codebook that is used by the wireless device for PMI reporting if column vectors of the reduced rank PMI are equal to the subset of column vectors of the PMI from the codebook that is used by the wireless device for PMI reporting for a chosen codeword that corresponds to one or more channels of the plurality of parallel channels with measurements higher than other channels of the plurality of parallel channels.

12. The method of claim 1 wherein the cellular communications network is a Long Term Evolution (LTE) cellular communications network.

13. A device adapted to:
   determine at least one of that an imbalance between a plurality of parallel channels of a spatial multiplexing downlink transmission to a wireless device based on a plurality of measurements where each measurement is indicative of a signal quality for a corresponding one of the parallel channels is greater than an imbalance threshold and that a Negative Acknowledgement (NACK) rate over time for the plurality of parallel channels of a spatial multiplexing downlink transmission reported by the wireless device is greater than a NACK rate threshold; and
   in response to determining at least one of that the imbalance between the plurality of parallel channels is greater than the imbalance threshold and that the NACK rate is greater than the NACK rate threshold, perform a rank reduction for the next downlink transmission whereby a rank is reduced from a rank indicator reported by the wireless device to some lower rank.

14. A radio access node in a cellular communications network, comprising:
- at least one processor; and
- a memory coupled to the at least one processor, the memory containing instructions executable by the at least one processor whereby the radio access node is operative to:
  - determine at least one of that an imbalance between a plurality of parallel channels of a spatial multiplexing downlink transmission to a wireless device based on a plurality of measurements where each measurement is indicative of a signal quality for a corresponding one of the parallel channels is greater than an imbalance threshold and that a Negative Acknowledgement (NACK) rate over time for the plurality of parallel channels of a spatial multiplexing downlink transmission reported by the wireless device is greater than a NACK rate threshold; and
  - in response to determining at least one of that the imbalance between the plurality of parallel channels is greater than the imbalance threshold and that the NACK rate is greater than the NACK rate threshold, perform a rank reduction for a next downlink transmission whereby a rank is reduced from a rank indicator reported by the wireless device to some lower rank.

* * * * *